United States Patent [19]

Sawant

[11] Patent Number: 5,017,390
[45] Date of Patent: May 21, 1991

[54] CONFECTION AND METHOD AND APPARATUS FOR MANUFACTURING IT

[75] Inventor: Vijay A. Sawant, Wellingborough, Great Britain

[73] Assignee: Conopco, Inc., Englewood Cliffs, N.J.

[21] Appl. No.: 381,671

[22] PCT Filed: Dec. 14, 1988

[86] PCT No.: PCT/EP88/01155

§ 371 Date: Jun. 26, 1989

§ 102(e) Date: Jun. 26, 1989

[87] PCT Pub. No.: WO89/05588

PCT Pub. Date: Jun. 29, 1989

[30] Foreign Application Priority Data

Dec. 14, 1987 [GB] United Kingdom ............... 8729152
Apr. 20, 1988 [GB] United Kingdom ............. 8809328.1

[51] Int. Cl.⁵ ............................................. A23G 9/04
[52] U.S. Cl. ..................... 426/100; 426/101; 426/249; 426/565; 426/91; 426/134; 426/104; 426/279; 426/306
[58] Field of Search ............ 426/100.91, 101, 134, 426/565, 104, 566, 279, 567, 660, 302, 306, 103, 249

[56] References Cited

U.S. PATENT DOCUMENTS

| | | | |
|---|---|---|---|
| 2,570,031 | 10/1951 | Gibson | 426/101 |
| 2,801,922 | 8/1957 | Oprean | 426/101 |
| 3,475,182 | 10/1969 | Goodman et al. | 426/302 |
| 4,272,558 | 6/1981 | Bouette | 426/312 |
| 4,542,028 | 9/1985 | Butcher et al. | 426/101 |
| 4,560,563 | 12/1985 | Tresser | 426/101 |
| 4,789,552 | 12/1988 | Speakman et al. | 426/101 |

FOREIGN PATENT DOCUMENTS

| | | |
|---|---|---|
| 848736 | 9/1952 | Fed. Rep. of Germany . |
| 2146942 | 3/1972 | Fed. Rep. of Germany . |
| 2398597 | 2/1979 | France . |
| 1297579 | 11/1972 | United Kingdom . |
| 2081064 | 2/1982 | United Kingdom . |
| 2108363 | 5/1983 | United Kingdom . |
| 2169843 | 7/1986 | United Kingdom . |

Primary Examiner—Jeanette Hunter
Attorney, Agent, or Firm—Brumbaugh, Graves, Donohue & Raymond

[57] ABSTRACT

A texturally contrasted frozen aerated confection comprising ice confection or mousse-like material in combination with an aerated fat-based glaze.

9 Claims, 2 Drawing Sheets

Fig.4.
Fig.5.
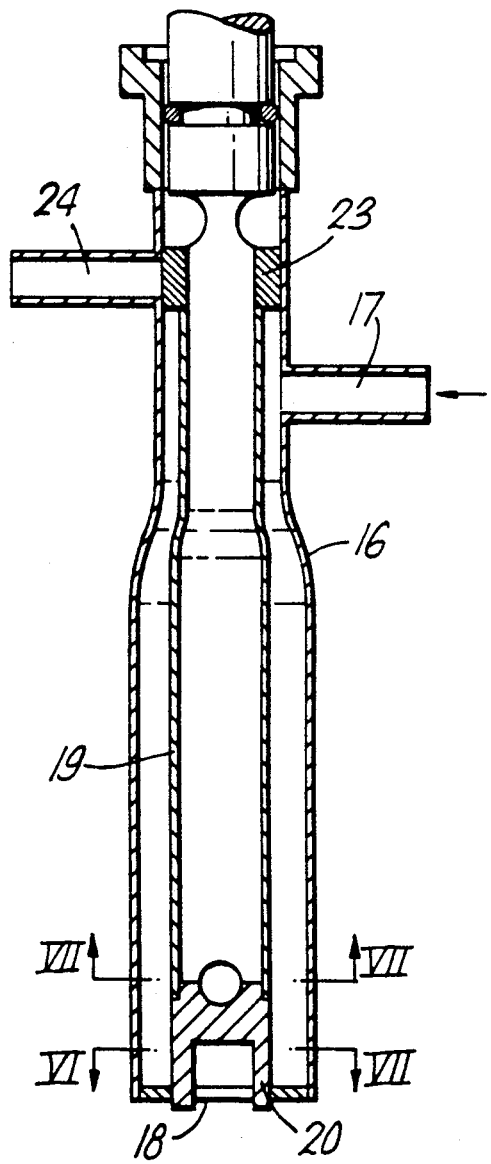
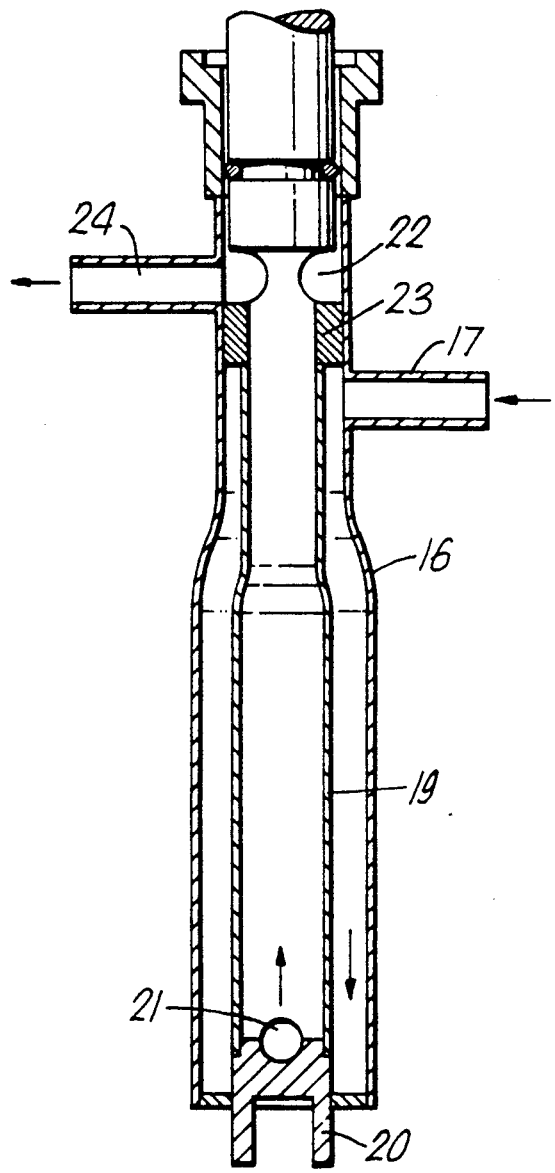
Fig.6.
Fig.7.
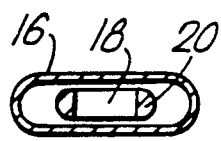
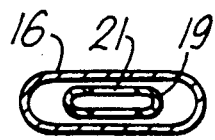

CONFECTION AND METHOD AND APPARATUS FOR MANUFACTURING IT

The invention relates to aerated ice confections and aerated chilled confections and in particular such confections containing additional material resulting in textural contrasts.

Combining aerated ice confection material, such as ice cream, ice milk and mellorine, with fat-based glaze is well known in the art, examples being chocolate coatings on ice cream bars, interleaving chocolate layers in ice gateaux, chocolate chips in the body of ice cream and "stracciatella".

The term fat-based glaze in this specification and the attached claims relates to a product, such as chocolate, white chocolate and couverture, which is solid at ambient temperature, has a continuous fat phase and which may contain sweeteners such as sugar, flavouring such as cocoa, vanilla, caramel, coffee and possibly milk solids.

Consumers appreciate the above-described texture contrast. However, the fat-based glaze should be applied such that the final product, having a usual temperature for ice confections or chilled confections of say $-20°$ to $-5°$ C. and $+5°$ to $+10°$ C., respectively, can be eaten without too much difficulty in spite of the hardness of the fat-based glaze at these temperatures. Namely, if chocolate or, in general, fat-based glaze were to be used in relatively large pieces in frozen or chilled confections, consumers would experience a hard material having relatively little taste at these temperatures.

Known solutions for solving this problem of hard glazes involve using relatively small particles, flakes, curled-up pieces, thin layers or fat-based glaze modified by adding a fat of relatively low melting point.

Different therefrom, the invention provides a solution which puts fewer limits to the size or to the melting point and consequently the melting characteristics of the glaze material in the mouth. To that end the invention is characterized in that the glaze material is aerated, showing a cellular structure, and is present as at least one particle having generally its main dimensions all in excess of 1.5 mm and preferably in excess of 2 mm.

Aerated in this context means any gas-expanded structure, such as with $CO_2$.

To be readily consumable at temperatures right from the freezing or chill cabinet, the aerated glaze preferably has an overrun of at least 50%, preferably 100%.

The aerated fat-based glaze may be used in several different manners, preferably as a slab or a bar arranged as a core in the confection, or as a plug or relatively big lump in the body of the confection, although it may also be used as a coating, as a layer, as a plurality of particles dispersed in the body of the confection material, as an edible container or as a swirl or ripple distributed throughout the confection material. A good perception is obtained if the particles have an average particle size of at least 1.5 mm cube and, in the case of larger gas cells, of say more than 1 mm diameter of at least 2 mm cube. However, more expressed contrast effects are obtained if the smallest main dimension of the particle or particles is in excess of 3 mm and more preferably in excess of 5 mm.

In another embodiment, the aerated glaze may be incorporated in the confection product as one or more interleaving layers between confection layers or between a confection layer and a different confection layer.

An aerated coating suitably reduces cracking off, which would occur if a coating of unaerated material in a similar thickness were to be applied, since an aerated coating is more easily bitable than an unaerated coating of the same thickness.

When making shaped confection products, aerated glaze can also be used as a swirl in the body thereof by simply extruding the aerated molten glaze material into the confection material.

The invention also relates to an apparatus for manufacturing aerated confections comprising fat-based glaze. In a conventional apparatus, as described in GB Patent specification No. 2 108 363, a plurality of slit-shaped nozzles for extruding ice cream is arranged along a conveyor, spraying nozzles for fat-based glaze being arranged between each pair of these slit-shaped nozzles. The spraying nozzles are connected to a supply for molten glaze.

The invention provides a modified apparatus for manufacturing aerated confection for consumption at temperatures not above chill temperatures, comprising a supply for aerated confection material selected from the group comprising ice confection material and mousse-like material connected thereto, a supply for molten fat-based glaze and at least one dispensing device for the fat-based glaze connected thereto through a conduit, wherein a mixing device and a supply means for pressurized gas are arranged, the dispensing device is provided with valve means and a glaze recirculation conduit is arranged between the dispensing device and the glaze supply.

In order that the aeration or overrun remains constant or reproducible, it is to be preferred that the molten glaze when being returned to the supply is degasified by arranging a suitable degasifier in the recirculation conduit, preferably a static mixer.

The invention finally provides a dispensing device, suitable for dispensing viscous material, in particular aerated fat-based glaze material, directly into frozen or chilled aerated confection material, said dispensing device comprising a dispensing conduit having a dispensing end, a dispensing valve adjacent the dispensing end having a dispensing and a non-dispensing position, a recirculation conduit communicating with the dispensing conduit, at least when the dispensing valve is in the non-dispensing position, and a recirculating valve in the recirculation conduit being operatively connected to the dispensing valve so as to close said conduit when the dispensing valve is in the dispensing position and to open it when the dispensing valve is in the non-dispensing position.

For an improved temperature control, it is preferred that the recirculation conduit is at least partly located within the dispensing conduit. The flow of the material to be dispensed is improved by the mutual movement of said conduits. Said movement can suitably be used for putting the valve means in either the one or the other position. Suitable movements are a rotation about the longitudinal axis in case of co-axial conduits having a circular cross-section, and a longitudinal movement in the case of a non-circular cross-section.

The invention will be explained in the following description of some embodiments, merely by way of example, reference being made to the accompanying drawings, in which:

FIG. 4 is a longitudinal section of a dispensing device in the dispensing position and FIG. 5 in the non-dispensing position;

FIG. 6 and 7 are cross-sectional views along the lines VI—VI and VII—VII in FIG. 5, respectively;

FIG. 1 shows in perspective view a bar ice confection product, comprising a cylindrical body 1 of ice cream and a central core 2 of aerated chocolate. Practical dimensions are a length of 6 to 8 cm, a diameter of 3 to 5 cm and a core diameter of 1 to 2 cm.

Figure 1:
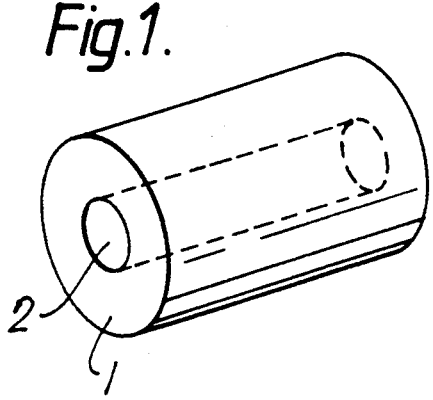
FIG. 1 is a perspective view of one embodiment of a confection according to the invention.
Figure 2:
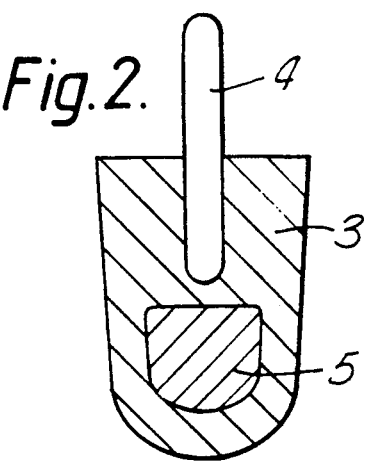
FIG. 2 is a sectional view of another embodiment.

FIG. 2 shows a sectional view of an ice confection stick product. Ice cream 3 in a usual tongue shape having a wooden stick 4 inserted therein comprises a plug 5 of aerated fat-based glaze of about 3 cm long, about 2 cm wide and about 0.8 cm thick.

Figure 3:
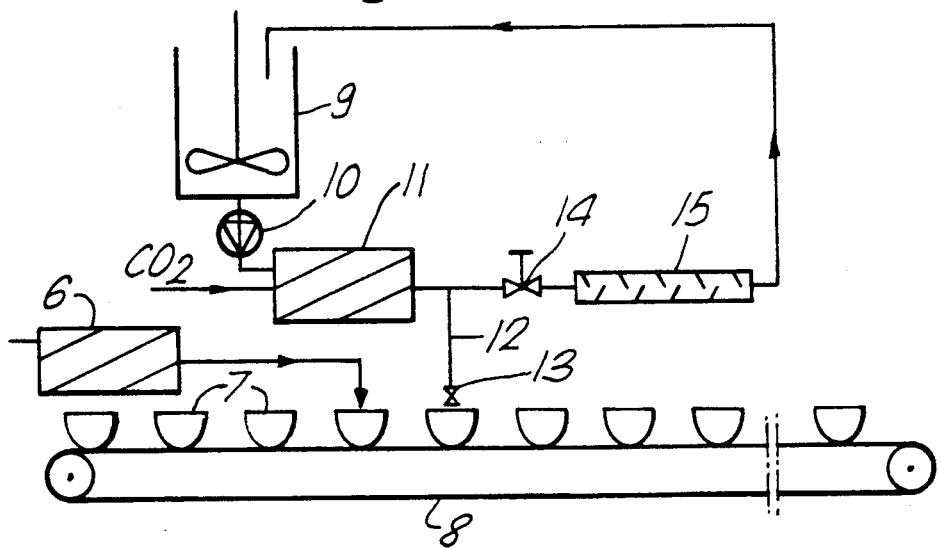
FIG. 3 is a schematic view of one embodiment of an apparatus according to the invention.

FIG. 3 shows a schematic view and flow scheme of an embodiment of an apparatus according to the invention. Ice cream is supplied from a usual ice-making machine 6 into moulds 7 supported on a conveyor 8.

Chocolate or a suitable vegetable fat containing a usual flavouring agent such as cocoa, vanilla, caramel, is melted in a container 9 and pumped by pump 10 to a mixer 11. Pressurized $CO_2$ is supplied to the mixer 11 and the molten chocolate is dispensed by a dispenser 12 having a dispensing valve 13 at the dispensing end thereof.

The chocolate is dispensed into the moulds 7 already containing ice cream and expands to an aerated condition. When the dispensing valve is put in the non-dispensing position, the chocolate is recirculated through a back-pressure valve 14 through a degasifying means, such as a static mixer 15, to the container 9.

A preferred embodiment of a dispensing device for directly filling aerated fat-based glaze into ice confection materials is shown in FIGS. 4 to 7.

A flattened dispensing tube 16 is provided with a supply side pipe 17 in the upper region, while the bottom is closed apart from a slit-shaped dispensing aperture 18.

A recirculation tube 19 is axially movable in the dispensing tube by a motor means (not represented). In the upper position as shown in FIG. 4 the dispensing aperture 18 is free, except for two legs 20 extending from the closed bottom of said recirculation tube 19.

In the upper position as shown in FIG. 5, said aperture is completely closed. However, the flow of material through the dispensing tube 16 may proceed through two openings 21 in the recirculation tube 19 above its bottom.

At its upper end, the recirculation tube is provided with two openings 22 just above a sealing ring 23 which is slidably supported in the outer tube 16, which at its upper end is provided with an exhaust tube 24.

Figure 8:
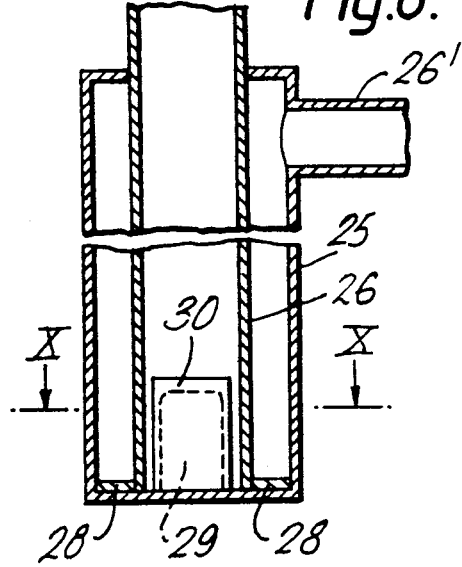
FIG. 8 is a longitudinal section of a dispensing device in another embodiment.
Figure 9:
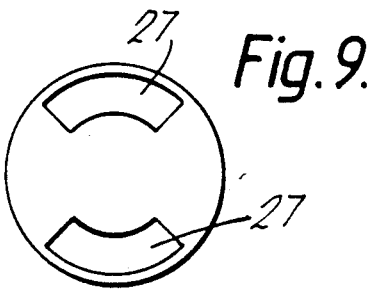
FIG. 9 is a bottom view of the device of FIG. 8.
Figure 10:
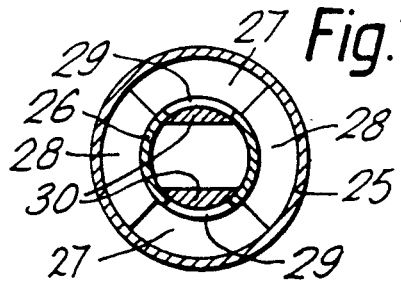
FIG. 10 is a sectional view along the line X—X in FIG. 8.

An alternative embodiment of the dispensing device according to the invention is shown in FIG. 8 to 10. In this embodiment the mutual movement of the inner and outer tube 25 and tube 26, respectively, is effected by rotation about their mutual axis. The outer tube or dispensing tube 25 again is provided with a supply tube 26'. The dispensing tube is closed at its bottom end apart from two sector-shaped openings 27. These openings may be opened and closed by a butterfly-shaped valve 28, which is supported at the lower end of the inner or recirculation tube 26.

The recirculation tube is provided with two openings 29, which may be opened and closed by two rounded extensions 30 supported on the bottom of the outer tube and extending as a pivot into the inner tube. The mutual rotation of the tubes may be effected in a usual manner (not shown). Recirculated material is discharged at the upper end 31 of the inner tube.

I claim:

1. A texturally contrasting frozen confection product, comprising: (a) a chilled material selected from the group consisting of ice confection and chilled mousse material; and (b) at least one particle of an aerated, fat-based glaze material having a cellular structure and an overrun of at least 50%, the smallest dimension of said at least one particle being in excess of 1.5 mm.

2. Confection product according to claim 1, wherein the smallest dimension of said at least one particle is in excess of 3 mm.

3. Confection product according to claim 1, wherein the glaze material is shaped as a slab and arranged as a core in the chilled material.

4. Confection product according to claim 1, wherein the glaze material is arranged as a single plug in the chilled material.

5. Confection product according to claim 1, wherein the glaze material is arranged as one or more interleaving layers.

6. Confection product according to claim 1, wherein the glaze material is dispersed as a plurality of particles in the chilled material.

7. Confection product according to claim 1, wherein the glaze material is shaped as a container in which the chilled material is contained.

8. Confection product according to claim 1, wherein the glaze material is a swirl in the body of the chilled material.

9. Method for manufacturing a frozen confection product according to claim 1, comprising dissolving a pressurized gas into a molten fat-based glaze material and injecting the resulting composition at a lower pressure into a chilled material selected from the group consisting of ice confection and chilled mousse material.

* * * * *